US009576915B2

(12) United States Patent
Huang et al.

(10) Patent No.: US 9,576,915 B2
(45) Date of Patent: Feb. 21, 2017

(54) IC-PACKAGE INTERCONNECT FOR MILLIMETER WAVE SYSTEMS

(71) Applicant: NXP B.V., Eindhoven (NL)

(72) Inventors: Mingda Huang, Eindhoven (NL); Markus Carolus Antonius van Schie, Haarlem (NL)

(73) Assignee: NXP B.V., Eindhoven (NL)

( * ) Notice: Subject to any disclaimer, the term of this patent is extended or adjusted under 35 U.S.C. 154(b) by 132 days.

(21) Appl. No.: 14/582,830

(22) Filed: Dec. 24, 2014

(65) Prior Publication Data

US 2016/0190673 A1 Jun. 30, 2016

(51) Int. Cl.
*H01L 23/50* (2006.01)
*H01L 23/66* (2006.01)
*H01L 23/64* (2006.01)
*G06F 17/50* (2006.01)
*H01L 23/522* (2006.01)
*H01L 49/02* (2006.01)
*H01P 5/02* (2006.01)

(52) U.S. Cl.
CPC ......... *H01L 23/645* (2013.01); *G06F 17/5022* (2013.01); *G06F 17/5068* (2013.01); *G06F 17/5081* (2013.01); *H01L 23/5227* (2013.01); *H01L 23/66* (2013.01); *H01L 28/10* (2013.01); *H01P 5/028* (2013.01); *H01L 2223/6638* (2013.01); *H01L 2223/6677* (2013.01); *H01L 2223/6683* (2013.01); *H01L 2224/04105* (2013.01); *H01L 2224/12105* (2013.01); *H01L 2224/16227* (2013.01); *H01L 2924/10253* (2013.01); *H01L 2924/14* (2013.01); *H01L 2924/1421* (2013.01); *H01L 2924/1423* (2013.01)

(58) Field of Classification Search
CPC ................................ H01L 23/50; H01L 23/66
USPC ................... 455/73; 438/14, 17, 106; 333/1
See application file for complete search history.

(56) References Cited

U.S. PATENT DOCUMENTS 3,969,752 A * 7/1976 Martin .............. H01L 23/49562
257/531
4,107,728 A * 8/1978 Max ...................... H01L 23/057
257/664
7,136,643 B2 * 11/2006 Campbell ................ H04B 1/40
340/10.1

(Continued)

OTHER PUBLICATIONS

Keysight Technologies. IC-CAP Device Modeling Software, Complete and Accurate Parameter Extraction for Semiconductor Device Modeling, Technical Overview, 18 pgs. (2014).

(Continued)

*Primary Examiner* — Dean Takaoka
*Assistant Examiner* — Alan Wong (57) ABSTRACT

Consistent with an example embodiment, a System on Chip (SoC) device operates in millimeter wave frequencies. The SoC device comprises, a silicon device having at least one differential pair pad, the at least one differential pair pad having a shunt inductor coupled thereon. A parasitic capacitance on at least one differential pair pads is tuned out by resonance of the shunt inductor. A package has a redistribution layer (RDL), with an array of contact areas to which the silicon device is mounted and then encapsulated. A connection corresponds to the at least one differential pair pad and the connection is located about an outer row or column of the array of contact areas.

11 Claims, 8 Drawing Sheets

(56) References Cited

U.S. PATENT DOCUMENTS

| | | | |
|---|---|---|---|
| 8,203,419 B2 | 6/2012 | Nazarian et al. | |
| 8,222,714 B2 * | 7/2012 | Shi | H01L 23/49822 257/531 |
| 8,395,472 B2 | 3/2013 | Roozeboom et al. | |
| 8,421,577 B2 | 4/2013 | Tiemeijer | |
| 8,482,114 B2 | 7/2013 | Spehar et al. | |
| 8,549,447 B2 * | 10/2013 | Eisenstadt | G06F 17/5054 716/100 |
| 8,766,714 B2 * | 7/2014 | Kaehs | H01L 23/645 330/269 |
| 2014/0206301 A1 * | 7/2014 | Geddada | H03H 7/40 455/83 |

OTHER PUBLICATIONS

Wojnowski, M. et al. "Embedded Wafer Level Ball Grid Array (eWLB) Technology for High-Frequency System-in-Package Applications", IEEE MTT-S Intl. pp. 1-4 (Jun. 2013).

Knapp, H. et al. "Three-Channel 77 GHz Automotive Radar Transmitter in Plastic Package", Radio Frequency Integrated Circuits Symposium, pp. 119-122 (Jun. 2012).

Wang, S. et al. Investigating Parasitic Capacitance Cancellation for EMI Suppression, IEEE Vehicle Power and Propulsion Conf., pp. 954-961 (Sep. 2009).

Neugebauer, T.C. et al. "Parasitic Capacitance Cancellation in Filter Inductors," IEEE Trans. on Power Electronics, vol. 21, No. 1, pp. 282-288 (Jan. 2006).

Chen, J. et al. On-Chip Spiral Inductors for RF Applications: An Overview, J. of Semiconductor Tech. and Science, vol. 4, No. 3, pp. 149-167 (Sep. 2004).

* cited by examiner

RDL routing to the edge of package
No ball depopulation, enable more IOs
FIG. 6B Increased spacing on package and PCB
FIG. 6C

IC-PACKAGE INTERCONNECT FOR MILLIMETER WAVE SYSTEMS

FIELD

The disclosed is directed toward implementing low-loss IC-to-package inter-connects at millimeter wave frequencies.

BACKGROUND

In the realm of millimeter wave frequencies, the design of systems operating in those frequencies on the order of 50 GHz poses a number of challenges. In addressing the challenges, embedded wafer-level ball grid array (eWLB) packaging technology may be used for millimeter wave systems operating above ~50 GHz for low-cost mass production.

Parasitic capacitance introduced by the I/O pads on the silicon significantly reduces the performance of the IC-to-Package interconnect at millimeter wave frequencies.

There exists a need for a packaging technique that minimizes the effects of parasitic capacitance of IO pads used for signals at millimeter wave frequencies.

SUMMARY

The present disclosure is applicable to millimeter wave SoC in which millimeter wave inputs and outputs are required. Specific examples, but not necessary so limited, can be automotive-radar ICs used for ADAS applications, such as autonomous emergency braking (AEB), but also phased array receivers or transmitters for high data rate communication applications.

Embodiments of the disclosure include the use of RF shunt inductors with appropriate size on the silicon to resonate with the parasitic capacitance of the millimeter wave I/O pads in order to create a low-loss IC-to-Package interconnect at millimeter wave frequencies. As a result, millimeter wave signals can be routed through RDL transmission lines in the package, which enable multi-channel transceiver SoC for millimeter wave application, e.g., automotive-radar. In addition, at low frequencies and DC, the shunt inductors provide a very low resistance path to the AC ground reference or power (i.e., VDD, GND) reference with a very large current handling capability, thereby providing excellent ESD protection of the sensitive millimeter wave circuits. Furthermore, according to this disclosure, the size of millimeter wave IO-pads can be increased to fulfill the reliability requirements without compromising the millimeter wave performance of the transition.

In an example embodiment, there is a method for fabricating a SoC millimeter wave device having reduced insertion loss on its differential input/output terminals. The method comprises determining a plurality of differential input/output terminals and measuring a capacitance of each of the plurality of the differential input/output terminals. A value of inductance is selected for a shunt inductor that is coupled to each of the plurality of the differential input/output terminals which cancels out effects of the capacitance of each of the plurality of input/output terminals; in response to selecting the value of inductance, a circuit layout is formed by placing on-device shunt inductors in the vicinity of the input/output terminals, the shunt inductors coupled between the input/output terminals and a voltage or ground reference. Running simulations on the circuit layout verifies whether acceptable values of shunt inductors are used, if simulations show acceptable values, a device design is generated. The verified device design is converted into wafer fab tooling. With the wafer fab tooling, silicon devices are fabricated.

In another example embodiment, there is System on Chip (SoC) device operating in millimeter wave frequencies. The SoC device comprises a silicon device. The silicon device has at least one differential pair pad having a shunt inductor coupled thereon. A parasitic capacitance on the at least one differential pair pad is tuned out by resonance of the shunt inductor. A package has a redistribution layer (RDL), to which the silicon device is mounted and encapsulated therein. The RDL has an array of contact areas, with a connection corresponding to the at least one differential pair pad, the connection located about an outer row or column of the array of contact areas.

The above summaries of the present disclosure are not intended to represent each disclosed embodiment, or every aspect, of the present invention. Other aspects and example embodiments are provided in the figures and the detailed description that follow.

BRIEF DESCRIPTION OF THE DRAWINGS

The invention may be more completely understood in consideration of the following detailed description of various embodiments disclosed in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The disclosed embodiments have been found useful in addressing a number of challenges associated in the building of millimeter wave systems on chip (SoC) operating at or above 50 GHz.

Figure 1:
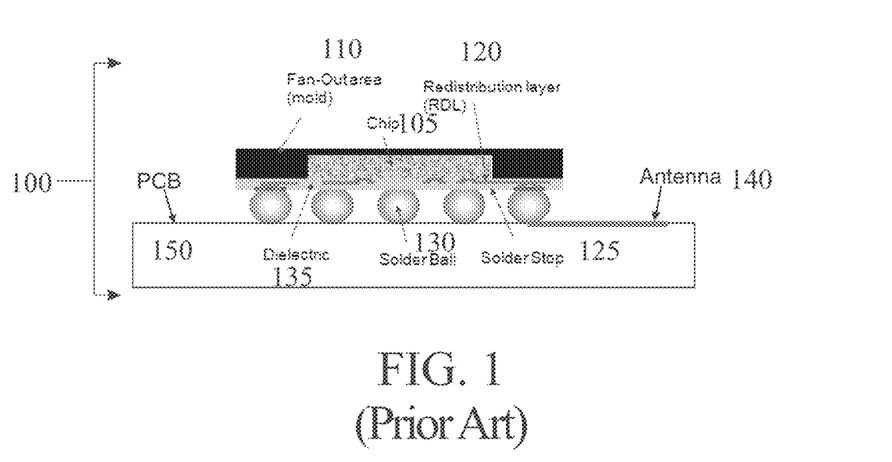
FIG. 1 (Prior Art) is an example of a packaging technology used in a millimeter wave system.

In an example embodiment, an embedded wafer-level ball grid array (eWLB) packaging technology was used for millimeter wave systems operating above ~50 GHz for low-cost mass production. In this technology 100, as shown in FIG. 1, a chip 105 is completely embedded in a mold compound 110. All of the inputs/outputs (I/O terminals) of the chip will go through IC-to-package transition, fan-out 120 via redistribution metallization layer (RDL), attach with solder balls 130, and then connect to a printed circuit board (PCB) 150. Dielectric 135 and a solder stop 125 isolate the RDL conductors from one another. Particular solder balls are coupled to an antenna 140.

Figure 2:
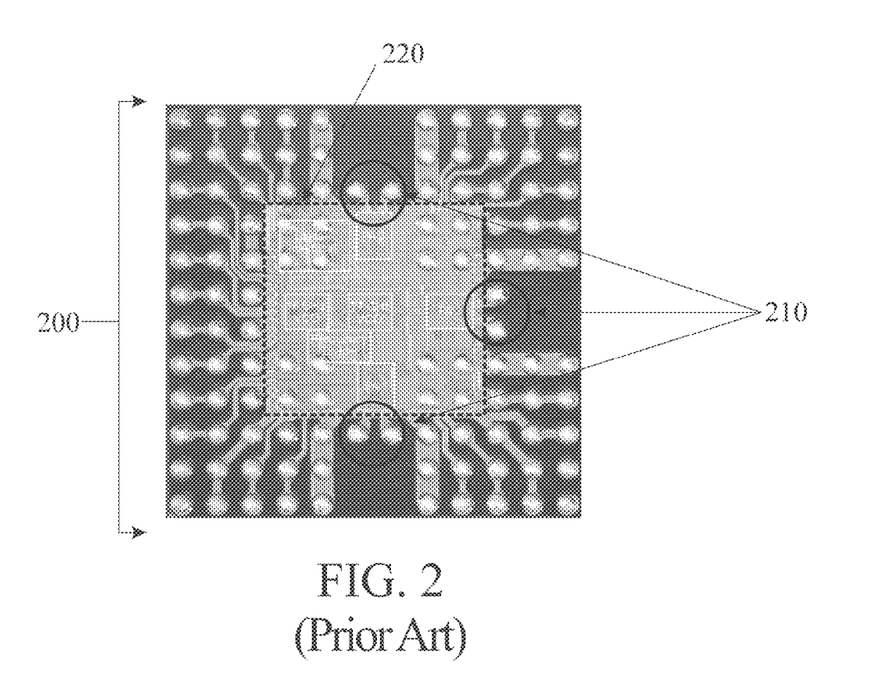
FIG. 2 (Prior Art) is an example embodiment of the underside of a packaged ADAS device showing the depopulation of solder balls in the vicinity of I/O pads of the IC device.

In an example application, a 77 GHz automotive radar sensor for advance driver assistance system (ADAS). FIG. 2 shows an eWLB package 200 of a transmitter IC (as indicated by a dashed-line box 220) for application in the 76-77 GHz band. It can be seen (in areas circled) that the IC consists of three transmitter paths 210. The strategy used for millimeter wave IC to package and PCB interconnect is to keep the RDL transmission line as short as possible and to match the IC to package and package to PCB interconnects as a whole transition. One reason is the parasitic capacitance introduced by the IO pads on the silicon significantly reduces the performance of the IC-to-Package interconnect at millimeter wave frequencies. This effect can be explained as follows. When a large reactive shunt admittance exists in the transition, large reactive currents will flow through this admittance. If long transmission lines are connected to this reactive admittance, these currents will flow through these transmission lines as well, and cause ohmic losses there. To avoid these large reactive currents and to reduce the losses of the total transition, the reactive admittances have to be tuned out very close to the admittance. Following this strategy, this contribution to the total losses of the transition is eliminated, and longer transmission lines can be used again without a penalty. If this is not done, very short transmission lines in the RDL must be used to obtain a reasonable quality interconnect. If only very short transmission lines can be used to redistribute the millimeter wave I/O, the total number of I/O is strongly limited. However, in practice, it will be difficult to apply this method for a multi-channel transceiver system-on-chip (SoC) since many more channels are needed in a single chip and as a result, RDL routing is required.

The parasitic capacitance effects of the millimeter wave I/O pads significantly reduce the performance of the IC-to-Package interconnect at millimeter wave frequencies. This demands that the RDL routing is as short as possible in order to let signals to reach the matching circuit on PCB quickly. However, without RDL routing the number of transceiver channels that can be used in a single chip will be limited by the size of the chip.

Going through IC to package and PCB interconnect, millimeter wave signals will go down to PCB via solder balls and route out below the package on the PCB top metal layer. Therefore solder balls on the way of routing need to be de-populated. For this reason it is desirable to use the outer most solder balls for the millimeter wave connections. If this technique is not applied, the number of IOs has to be reduced. In addition, reliability of the package will also be reduced due to the de-population of many solder balls.

Without RDL routing, the spacing between each of the millimeter wave channels is limited by the size of the chip, which leads to higher parasitic and undesired coupling between different channels.

Proper ESD protection of millimeter wave IO pads is important but very difficult to realize. This present disclosure naturally provides a robust ESD protection mechanism, which is a very low ohmic connection to ground, with a large current handling capability.

In an example technology, the RF performance of the IC-to-Package interconnect strongly depends on the size (capacitance) of the IO pads. Smaller I/O pads have less shunt capacitance, and provide a lower-loss and higher-bandwidth transition. This loss is often referred to as "insertion loss." Insertion loss is the loss of signal power resulting from the insertion of a device in a transmission line or optical fiber and is usually express in decibels (dB). However, smaller I/O pads have a weaker mechanical connection between the die and the RDL, leading to reliability issues. In accordance with the disclosed embodiments, this trade-off between optimum RF performance and optimum mechanical reliability is eliminated.

To address the afore-mentioned challenges, in the disclosed embodiments, the user applies RF shunt inductors with appropriate size on the silicon to resonate with the parasitic capacitance of the millimeter wave I/O pads in order to create a low-loss IC-to-Package interconnect at millimeter wave frequencies. In this way, millimeter wave signals can be routed through RDL transmission lines in the package. At the same time, the shunt inductors will short-circuit any ESD pulse to protect the sensitive millimeter wave circuitry. Furthermore, the size of I/O-pads will not be limited by the requirements of having minimum parasitic capacitance at millimeter wave frequencies, and can be designed to fulfill the reliability requirements.

In an example embodiment, the ESD immunity that these shunt inductors provide depends mainly on the properties of the metal traces used to build the inductor. More specifically it depends on the cross section surface of the metal traces. The thicker the metal, the higher the current handling capability. Metal thickness is usually a given number in an IC process. Metal width can be chosen within certain design rules and also directly relates to the current handling capability. The current handling capability is the main factor determining the ESD protection level. The inductors can provide protection on ESD event larger than 1 KV at least, probably can be up to 2 KV.

Figures 3A, 3B:
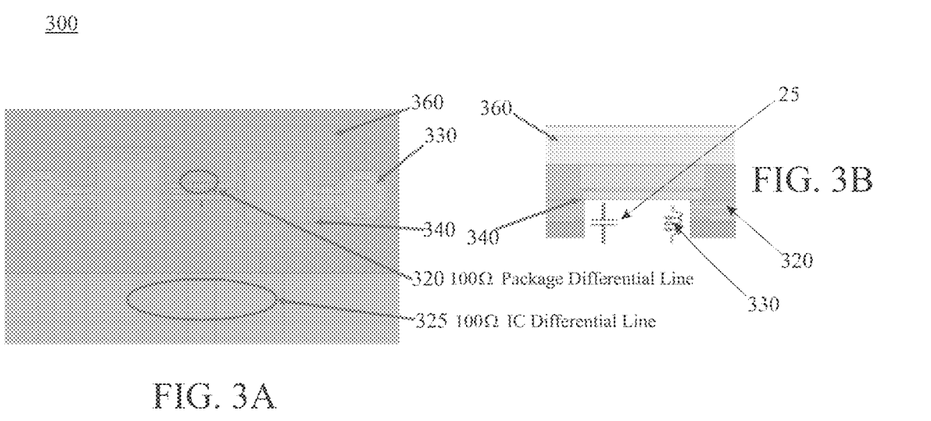
FIGS. 3A-3C are drawings from different perspectives of adding pad inductance according to an embodiment of the present disclosure.
Figure 3C:
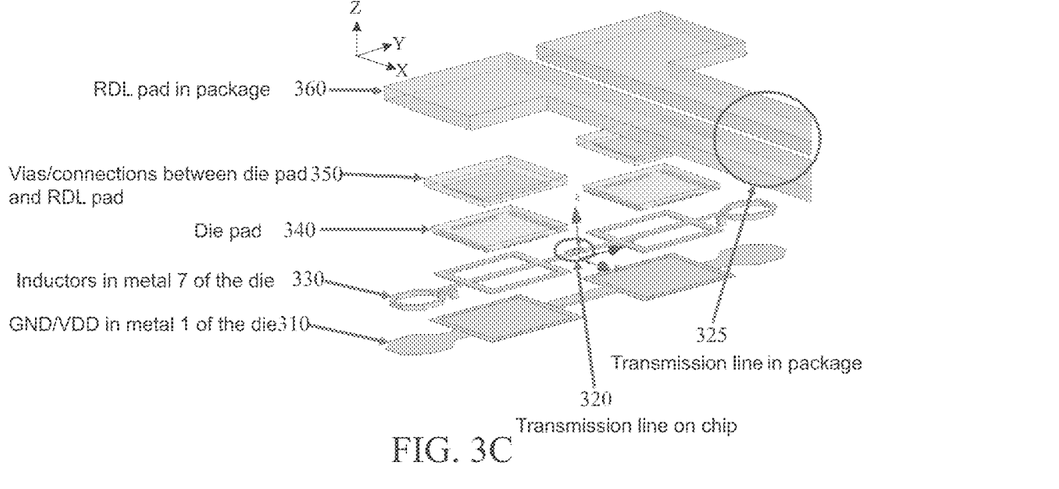

Refer to FIGS. 3A-3C. In an example embodiment, a portion of an assembly 300 using differential millimeter wave I/O pads, with package differential lines 320, coupled to a differential line 325 (whose impedance is 100 ohms) on an active device IC, are connected to shunt inductors 330 on each side. The I/O pads have a parasitic capacitance 25 whose effect is reduced by the introducing inductors 330. The shunt inductors have either a connection to GND or VDD of the metallization 310 of the active silicon die, depending upon the RF circuit requirements. Through one or more metal layers, ending in this example, a metal layer 7, inductors 330 are built to inductively couple the 100 ohm differential line 320 on the silicon die to ground (at the I/O pads). Additional layers 340 with vias and metallization and passivation about the boundaries of the I/O pads complete the I/O stack. The packaging (not illustrated) containing the active silicon connects the differential I/O pads 340 to redistribution layer (RDL) pads 360. By tuning the value (size) of the inductors, the effects of the parasitic capacitance of the millimeter wave I/O pads can be minimized and low-loss IC-to-package interconnects may be realized.

A discussion on the making of inductors suitable for an integrated circuit device may be found in U.S. Pat. No. 8,203,419 B2 granted on Jun. 19, 2012, titled, "Inductor," of Alexé Levan Nazarian and Lukas Frederik Tiemeijer. This reference is incorporated by reference in its entirety.

Further discussion on the making of planar inductive components may be found U.S. Pat. No. 8,421,577 B2 granted on Apr. 16, 2013, titled, "Planar Inductive Unit and an Electronic Device Comprising a Planar Inductive Unit," of Lukas Frederik Tiemeijer. This reference is incorporated by reference in its entirety.

In designing the circuit according to the present disclosure, the die pad has not only parasitic capacitance; actually it is a RLC network since there are not only die pad and also transmission lines at the die-package interconnect. Of course, the major effects are due to the parasitic capacitance. The range of the parasitic capacitance for a differential pair of such a die-pads can be between 10 fF-150 fF; for instance, a typical value can be about 37 fF. With reference to FIGS. 3A-3C, a pair of shunt inductors used is around 110 pH in total. The range can be about 25 pH to 400 pH.

With respect to EDA tools, in an example design flow the user normally relies on validated compact models for both the capacitances as well as the inductors. Alternatively, (3D) EM simulation or "parasitic extraction tools" (i.e., RLC extraction or RLCk extraction) may be used to determine the die-pad capacitance. The "validated compact models" means the parasitic capacitance, die-package transition, and inductors have been measured, and then circuit models are built-up based on the measurement. Models based on EM simulation or RC extraction tools are also built-up in order to match the measurement results.

Figure 4:
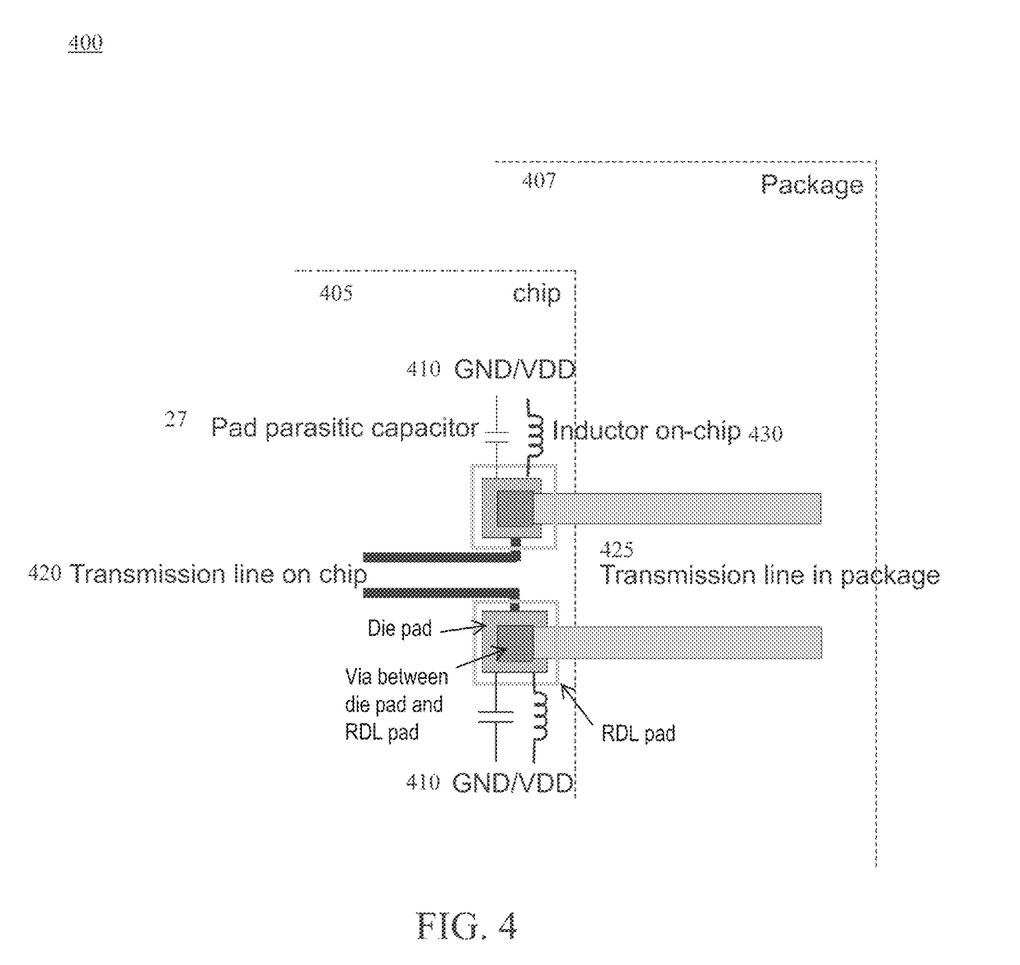
FIG. 4 is a simplified view of an embodiment according to the present disclosure.

Refer to FIG. 4. n an example embodiment according to the disclosure, a simplified layout (in an underside view) implementation a differential line of millimeter wave SoC package 400 with its accompanying integrated circuit (IC) 405, is shown by the dashed-line box. In an example implementation, the IC 405 may have more than one differential line 420 fed by a differential line 425 of the package 407. In a particular example implementation, the IC 405 may have three transmitter channels and four receiver channels. The pad parasitic capacitance 27 is compensated by an on-chip shunt inductor 430. Each channel is routed out from the IC 405 to the outer side of the package 400 via RDL 425 by using the disclosed IC-to-package interconnects.

Figure 5:
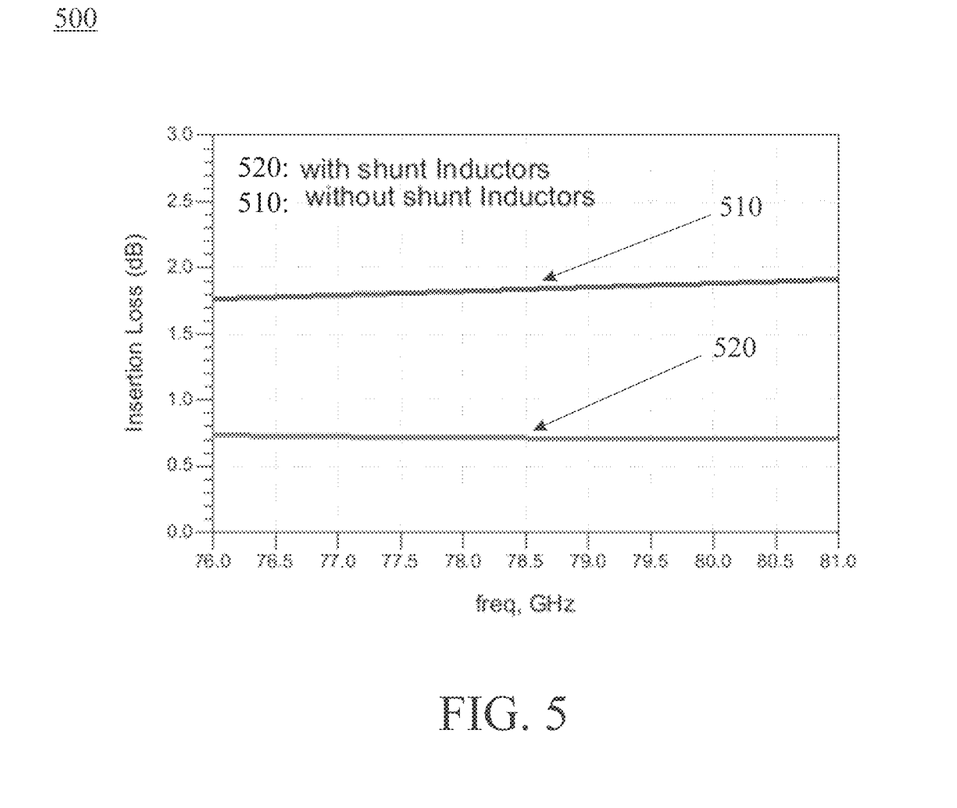
FIG. 5 are plots of simulation of the insertion loss of a millimeter wave IC-to-Package interconnect with and without shunt inductors according to the present disclosure.

Refer to FIG. 5. A plot of the insertion loss v. frequency for an example embodiment according to the disclosure shows a first plot 510 of an RF transmission line for a given millimeter wave IC-to-package interconnect I/O without shunt inductors. The insertion loss is about 1.8 dB. A second plot 520 shows, for the RF transmission line for the given package I/O and insertion loss of about 0.7 dB. The insertion loss is significantly reduced by 1.1 dB. FIG. 5 shows a simulation result based on a circuit model. The measurements were done indirectly. i.e. the output power of transmitters and noise figure of the receivers were measured extensively. The results agree with simulation and actually even a bit better, indicating functional interconnects. Or in other words, after the de-embedding, it will lead to very similar results as FIG. 5. For example, a 2.2 dB improvement translates to about >66% improvement. Note that "de-embedding" is the process of taking the raw data that are measured in a test fixture and removing those test fixture effects so that the needed data are accurate to reference planes which are more relevant.

Figure 6A:
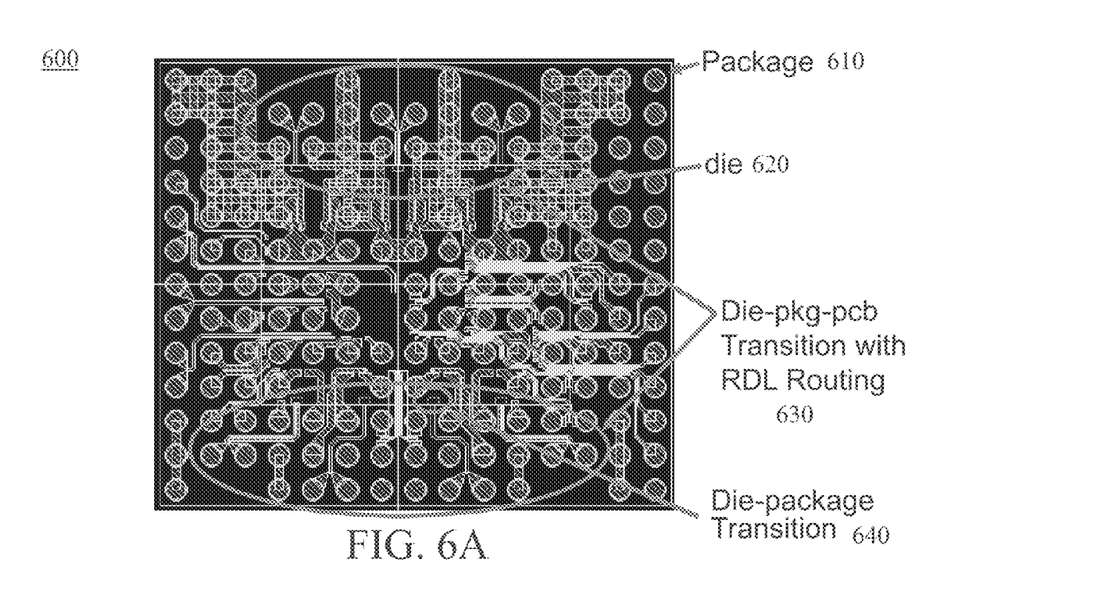
FIGS. 6A-6C are underside views of a package having RDL configured according to an embodiment of the present disclosure.
Figure 6B:
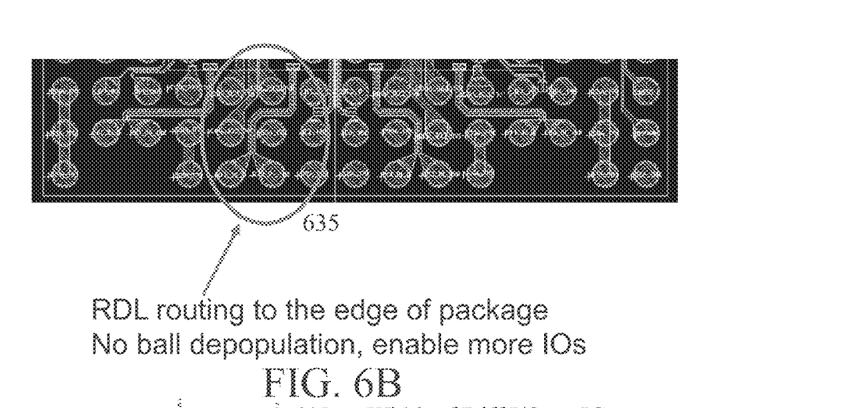
Figure 6C:
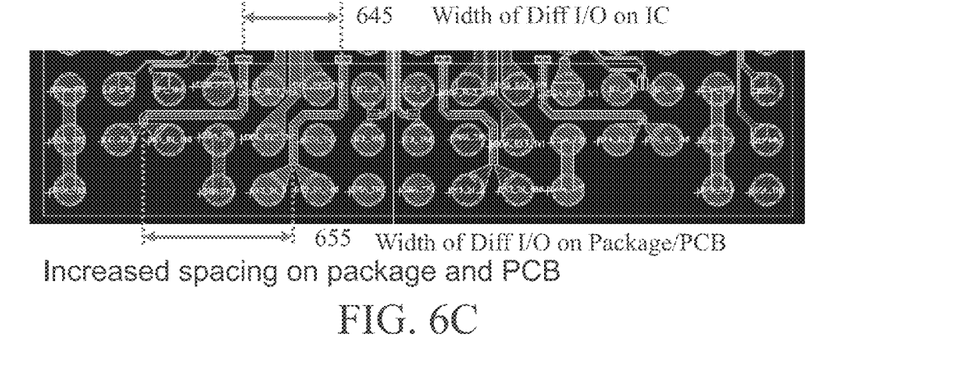

Refer to FIGS. 6A-6C. An SoC multiple transmitter/receiver (i.e., TRx SoC) device having four receiver differential inputs and three differential transmitter outputs. Refer to FIG. 6A. A four receiver/three transmitter (i.e, 4 RX, 3 TX) device 600 is depicted on the package underside to which solder balls are attached. Ultimately the SoC package 610 is soldered onto a PCB system board. The device die 620 is attached to this package 610. There is a die-to-package transition 640 for the four receiver inputs. The RDL layer routes these differential inputs to solder pads along the periphery of the package. Likewise, there is a die-to-package transition 645 for the three differential transmitter outputs. The RDL also layer routes these differential outputs to solder pads along the periphery of the package. Refer to FIG. 6B. The present disclosure of incorporating the shunt inductors enables a layout 635 without depopulating solder balls (i.e., reducing features in the SoC and mechanical robustness/reliability) so that more I/O terminals are possible. Further, the width 645 between differential I/O terminals on the IC device is increased which results in increased spacing 655 of the I/O terminals on the package and PCB. The increased spacing substantially reduces cross-talk and mutual coupling among the three TX and four RX terminals of the SoC radar sub-system.

The spacing depends on isolation requirements. For an example application—30 dB is required, which leads to 1.5 cm minimal spacing between each channel. In addition certain special design configuration is taken (e.g., ground-signal-signal-ground) in order to reach the requirement. There is not much limitation on the maximum spacing. It depends on the size of the package and the floor plan of the chip. But too big size of package may lead to reliability problems of the package and higher cost In an example application, the size of the package used is 7.5 mm by 6.5 mm. In another example the package size may be 7.5 mm by 7.5 mm. However, there is no hard limit on the package size. For an example application, the size of the solder balls is about 300 μm.

Figure 7:
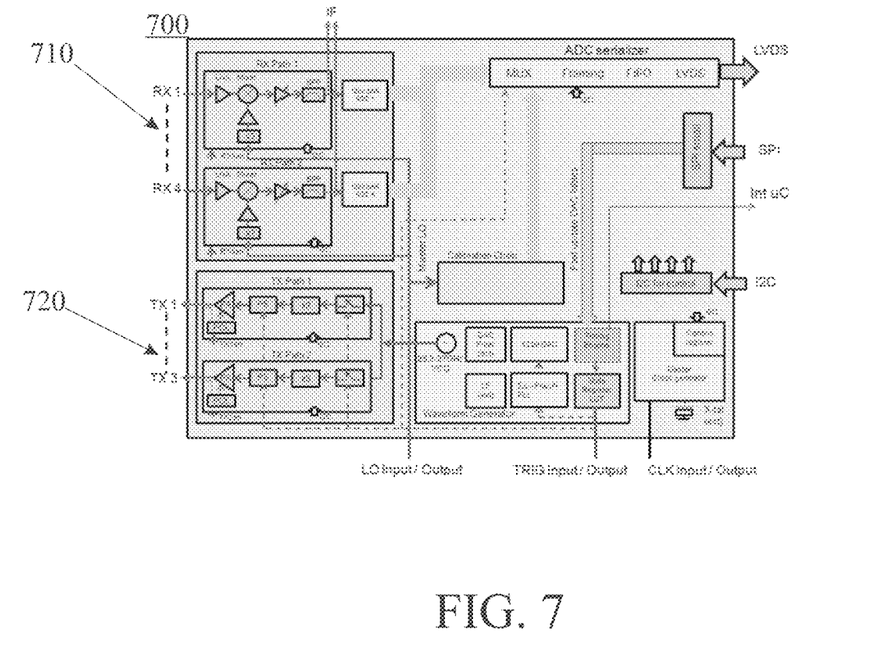
FIG. 7 is a block diagram of a multiple transmitter/receiver SoC for a radar application whose transmitter outputs and receiver inputs are designed according to embodiments of the present disclosure.

Refer to FIG. 7. A block diagram 700 of a multiple transmitter/receiver SoC for automotive radar applications shows the four RX terminals 710 and the three TX terminals 720. These sets of terminals have substantially reduced insertion loss owing to embodiments of the present disclosure. The reduced insertion loss in the receive path directly leads to a reduced noise figure of the receiver, thereby increasing the sensitivity of the receiver. High receiver sensitivity is very important in radar systems because the reflected signals are very weak. The reduced insertion loss in the transmit path directly affects the transmitted power. Transmitting large power levels is very challenging at these operating frequencies. Furthermore, it is very difficult to realize reliable and efficient transmitters at these frequencies. For the same output power specification, applying the present invention allows to reduce the conducted output power in the power amplifier. This leads to lower power dissipation in the IC and less voltage stress on the PA transistors, which results in higher reliability. In addition, lower power dissipation leads to better thermal behavior and less stringent thermal design requirements.

Figure 8:
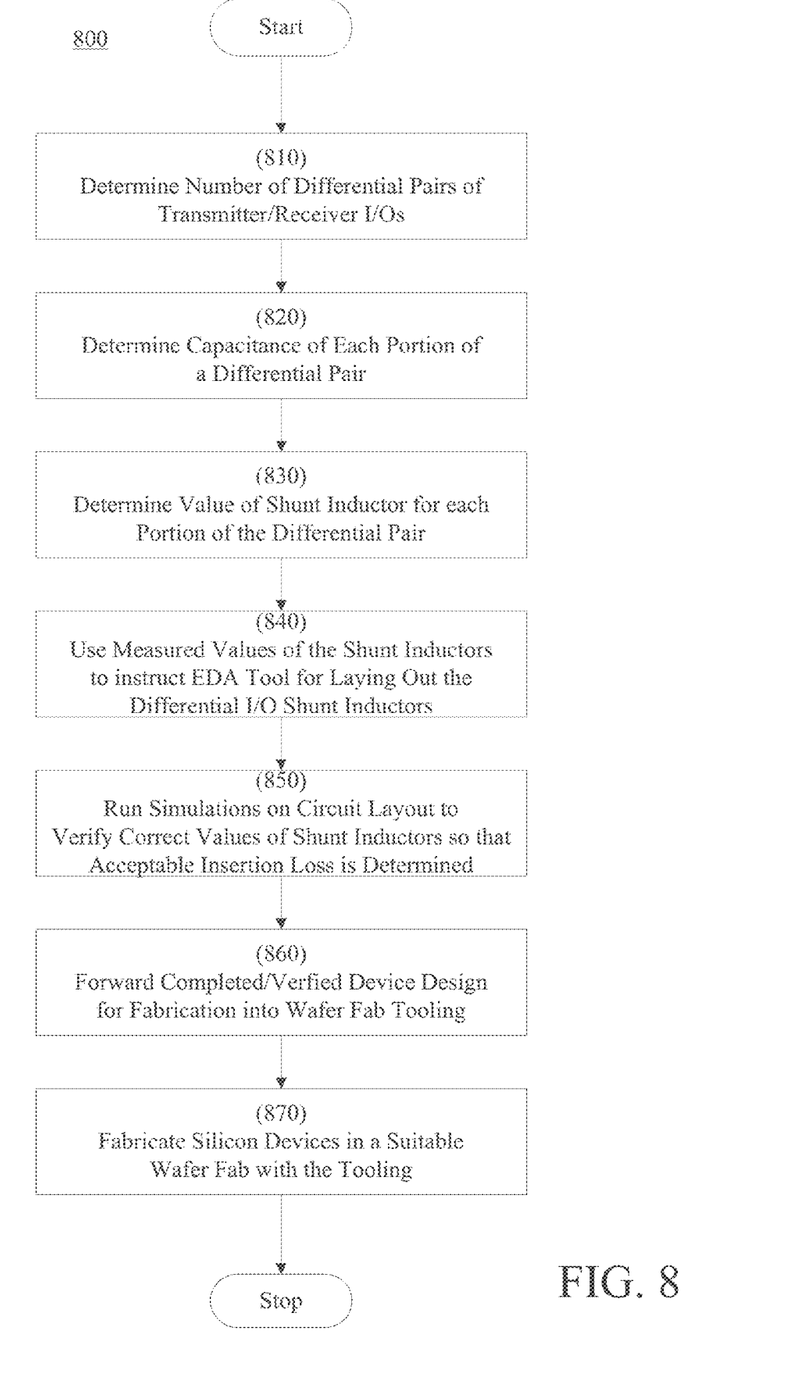
FIG. 8 is a flow diagram of an example process of implementing embodiments according to the present disclosure.

Refer to FIG. 8. In an example embodiment, there is a process 800 for implementing the shunt inductors into the multiple transmitter/receiver device that has been incorporated into the SoC application. In step 810, the designer has to determine the number of differential pairs of inputs and outputs. In step 820, the parasitic capacitance of each input/output terminal has to be measured. The measurement may be through simulation of the proposed circuit design or actual bench measurements on an existing product needing improvement performance and reduced insertion loss. In some embodiments, the tools used to build a multi-channel transceiver SoC, such as a 3-TX 4-RX radar transceiver, would be based on physical fabrication parameters on silicon, and the like. Having determined the parasitic capacitance, in step 830 the value of the shunt inductor required for each portion of the differential pair is determined. The shunt inductor has a value such that the effects of the parasitic capacitance are cancelled out. In some embodiments, the values would be based on empirical measurements of actual fabricated circuits and simulations that provide information for modeling. In step 840, the measured values of the shunt inductors (obtained through simulation and bench measurements) are used to layout the differential I/O shunt inductors. In a modern multi-level metallization system, these inductors may be constructed in multiple layers with intermetallic connections (i.e., vias) between layers. Thus, coils of inductors of sufficient values may be built. In step 850, simulations would be run on the circuit layout to verified correct values of shunt inductors so that an acceptable insertion loss is obtained. Having completed the simulations, in step 860, the completed/verified device design is fabricated into wafer fab tooling. These would be the mask plates used in a modern photolithographic process. The design tools supporting date for accurate simulation is derived from actual measurements of process test patterns and sample circuits the particular wafer fab is capable of producing. In modern circuit design and production, these wafer fabs may be foundries capable of performing many difference processes which are tweaked to a customer's specific design library. The design tools have libraries of re-usable blocks applicable to a specific design process which a user may employ. Having built the tooling for the particular wafer fab used, in step 870, the silicon devices are fabricated. Depending upon a specific technology challenge, other substrates such as gallium arsenide (GaAs), Silicon-Germanium (SiGe) or silicon on insulator (SOI) can be used as well. The EDA tools would be customized to the properties of these alternatives to silicon substrates.

Figure 9:
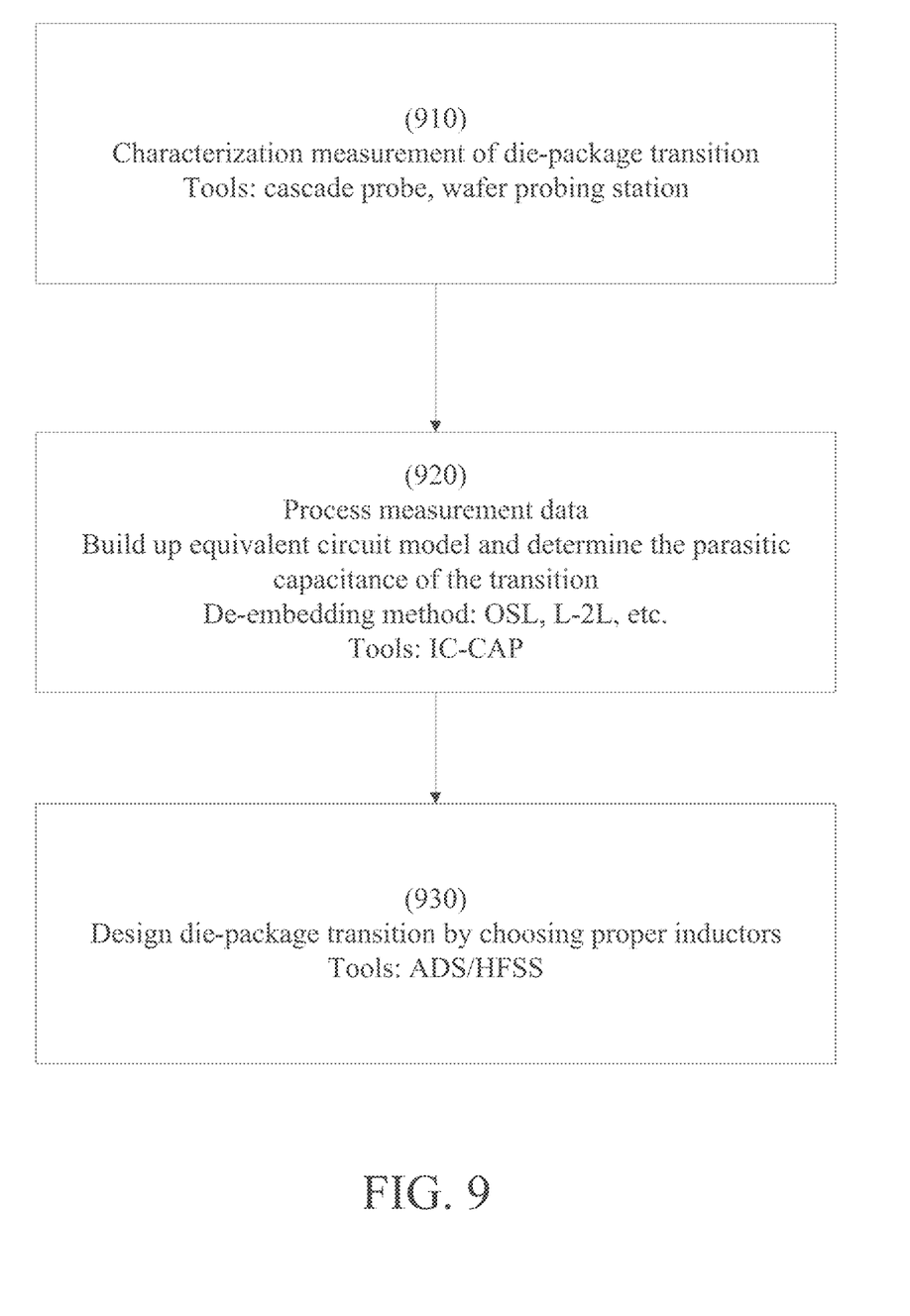
FIG. 9 is a flow-diagram of a process for determining the die-to-package transition shunt inductance required.

Refer to FIG. 9. In going from each section of the device according to the present disclosure, the die-package transition may be measured and characterized on wafer probing station 910. One type of probe used for on-wafer testing is a Cascade Probe, manufactured by Cascade Microtech. Inc. Beaverton, Oreg., USA. The die side of the transition, open, short, load standards are connected on the die. Process measurement data are used to build equivalent circuit models to determine the parasitic capacitance of the transition 920. On the package side of the transition, differential line and probe pad are connected. By measuring these different standards and using a certain de-embedding method, i.e., L-2L method, the equivalent circuit model of the transition was derived using IC-CAP Integrated Circuit Characterization and Analysis Program). IC-CAP is a product of Keysight Technologies, Santa Rosa, Calif., USA, Further information may be found in Keysight Technologies, "IC-CAP Device Modeling Software, Technical Overview," August 2014, pp. 14.

After that 3D-EM model was also built by using ADS/HFSS in order to co-design the whole interconnect of die, package, and PCB together. The proper values of inductors (that are built in the multiple metal layers of the silicon) are chosen to compensate for the parasitic capacitance of the die-to-package transition 930.

Various exemplary embodiments are described in reference to specific illustrative examples. The illustrative examples are selected to assist a person of ordinary skill in the art to form a clear understanding of, and to practice the various embodiments.

However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this disclosure, it will be appreciated that those designations are given with reference to the corresponding drawings, and that if the orientation of the device changes during manufacturing or operation, other positional relationships may apply instead. As described above, those positional relationships are described for clarity, not limitation.

The present disclosure has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this disclosure encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present disclosure, the only relevant components of the device are A and B.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs).

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

The term world wide web or web is a system of linked hypertext documents access through the internet. Using a web browser, a user can view web pages that include text, images, video, and other media and navigate between these pages with hyperlinks.

The term file or a set of files refers to any collection of files, such as a directory of files. A file can refer to any data object (e.g., a document, a bitmap, an image, an audio clip, a video clip, software source code, software executable code, etc.). A file can also refer to a directory (a structure that contains other files).

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Numerous other embodiments of the invention will be apparent to persons skilled in the art without departing from the spirit and scope of the invention as defined in the appended claims.

The invention claimed is:

1. A method for fabricating a SoC millimeter wave device having reduced insertion loss on its differential input/output terminals, the method comprising:
determining a plurality of differential input/output terminals;
measuring a capacitance of each of the plurality of the differential input/output terminals;
selecting a value of inductance for a shunt inductor that is coupled to each of the plurality of the differential input/output terminals which cancels out effects of the capacitance of each of the plurality of input/output terminals, wherein the value of inductance is selected so that insertion loss is at least less than 1 dB at a frequency range of 76 GHz to 81 GHz;
in response to selecting the value of inductance, forming a circuit layout by placing on-device shunt inductors in the vicinity of the input/output terminals, the shunt inductors coupled between the input/output terminals and a voltage or ground reference;
running simulations on the circuit layout to verify whether acceptable values of shunt inductors are used, if simulations show acceptable values, generate a device design;
converting the verified device design into wafer fab tooling; and
fabricating silicon devices with the wafer fab tooling.

2. The method as recited in claim 1, wherein the value of inductance is further selected so that insertion loss is in the range of about 0.6 dB to about 1 dB at a frequency range of about 76 GHz to about 81 GHz.

3. The method as recited in claim 1, wherein the value of inductance is further selected so that insertion loss is about 0.75 dB at a frequency range of about 76 GHz to about 81 GHz.

4. The method as recited in claim 1, wherein the capacitance includes that from the silicon device, SoC packaging RDL.

5. A System on Chip (SoC) device operating in millimeter wave frequencies, the SoC device comprising:
a silicon device having
at least one differential pair pad having a shunt inductor coupled thereon,
wherein a parasitic capacitance on at least one differential pair pad is tuned out by resonance of the shunt inductor, and
wherein the value of the shunt inductor is chosen such that insertion loss for the at least one differential pair pad is less than 1 dB; and
a package having a redistribution layer (RDL), to which the silicon device is mounted and encapsulated therein, the RDL having an array of contact areas, with a connection corresponding to the at least one differential pair pad, the connection located about an outer row or column of the array of contact areas.

6. The SoC as recited in claim 5, wherein
the at least one differential pair pad is either an input pad or an output pad.

7. The SoC as recited in claim 5, wherein the at least one differential pair pad further comprises at least one differential pair input pad and at least one differential pair output pad.

8. The SoC device as recited in claim 7, wherein the shunt inductor is fabricated in multiple metal layers and is coupled to one pad of the at least one differential pair input pad and the at least one differential pair output pad, and the shunt inductor is coupled between the one pad and ground.

9. The SoC device as recited in claim 5, wherein the value of the shunt inductor is further chosen such that the insertion loss is in the range of about 0.7 dB to about 0.9 dB.

10. The SoC device as recited in claim 8 is a four receiver and three transmitter automotive radar device,
wherein each of the four receivers includes a differential input pair; and
wherein each of the three transmitters includes a differential output pair.

11. The SoC device as recited in claim 7, wherein the shunt inductor is coupled between the at least one differential pair input pad and ground, and a second shunt inductor is coupled between the at least one differential pair output pad and ground.

* * * * *